Figure 1:
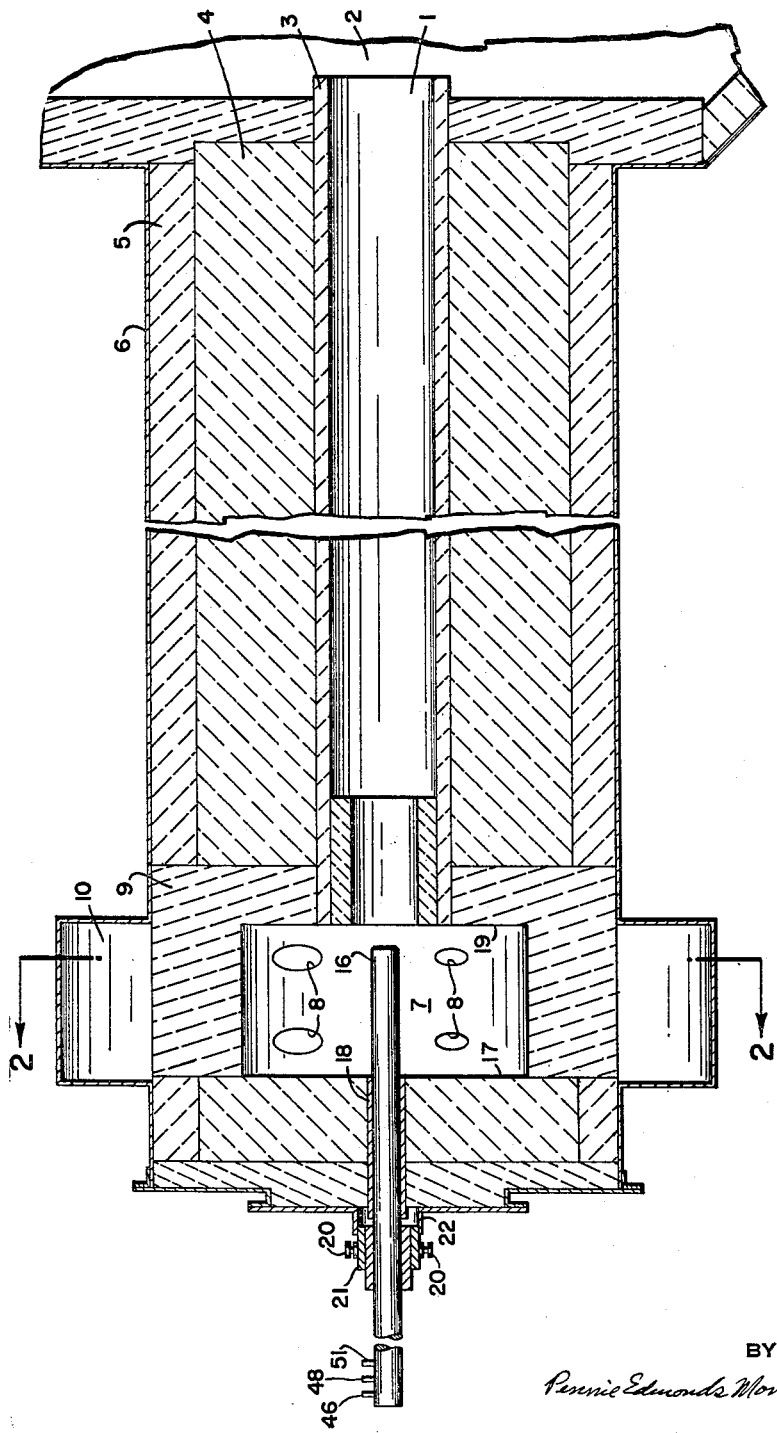

INVENTORS
GEORGE L. HELLER
LLOYD L. COLE
BY
Pennie Edmonds Morton, Barrows & Taylor
ATTORNEYS

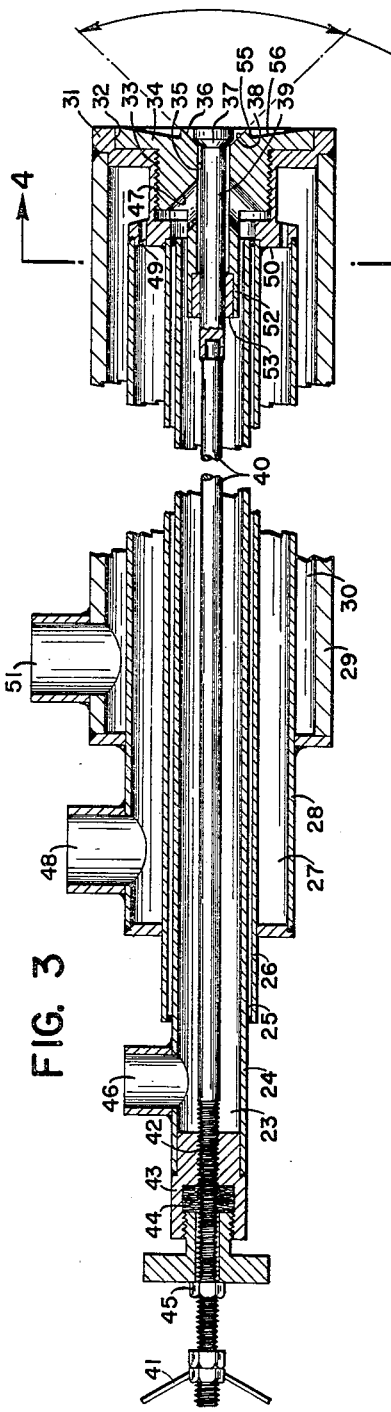
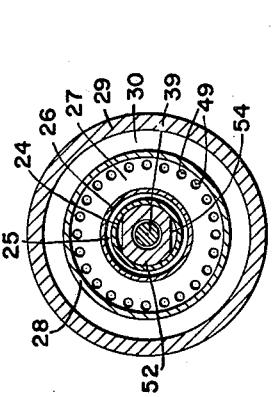
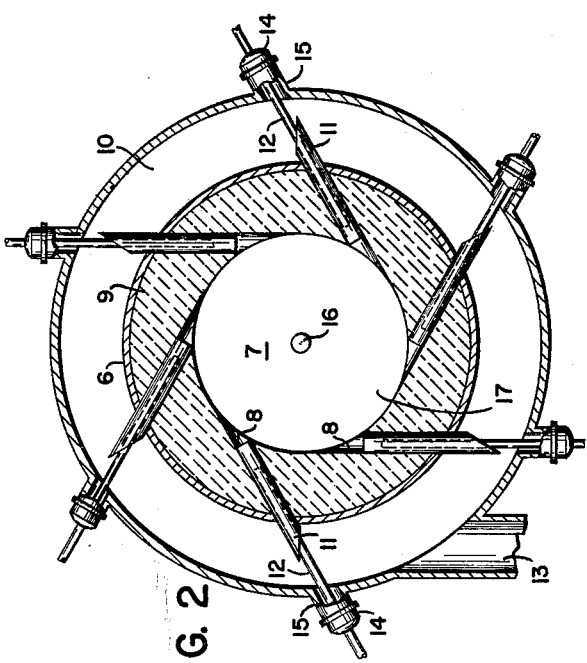

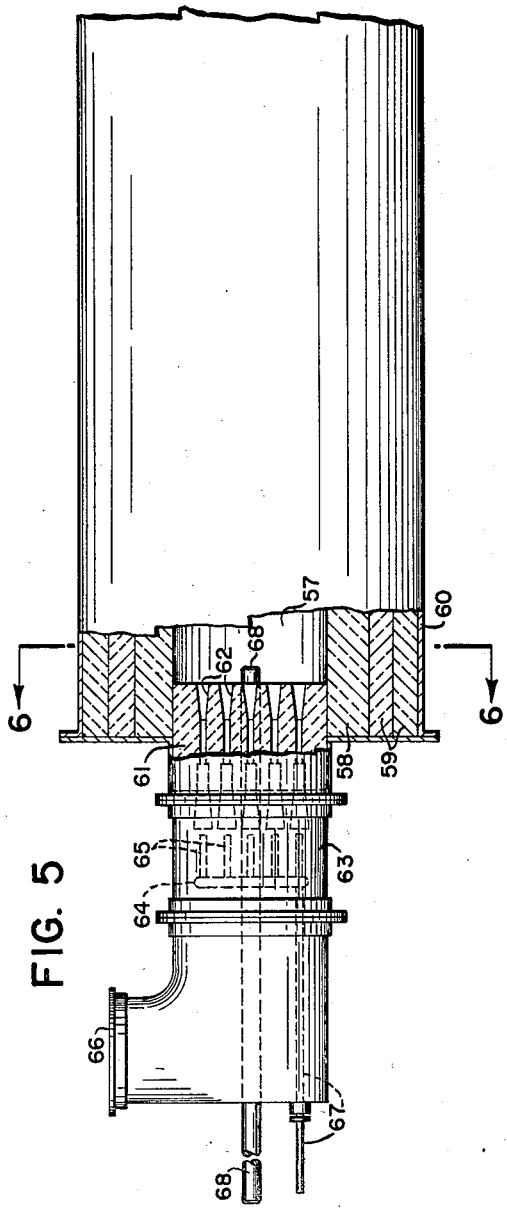
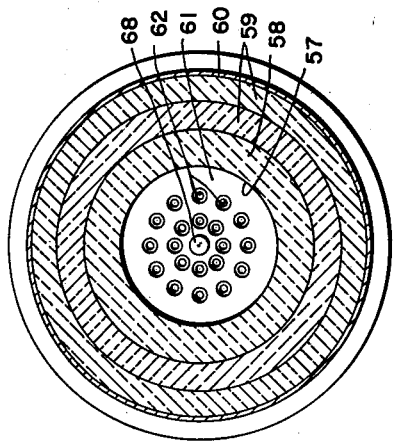
INVENTORS
GEORGE L. HELLER
LLOYD L. COLE
BY
*Pennie Edmonds Morton Barrows & Taylor*
ATTORNEYS

United States Patent Office 3,079,236
Patented Feb. 26, 1963

3,079,236
MANUFACTURE OF CARBON BLACK
George L. Heller, Monroe, and Lloyd L. Cole, Fairbanks, La., assignors, by mesne assignments, to Columbian Carbon Company, New York, N.Y., a corporation of Delaware
Filed Aug. 12, 1960, Ser. No. 49,195
8 Claims. (Cl. 23—209.4)

The present invention relates to the production of carbon black by the decomposition of hydrocarbons and, more particularly, to processes of the furnace type whereby the hydrocarbon to be decomposed is separately and forcefully injected into a stream of hot blast flame gases and rapidly mixed therewith, whereby the hydrocarbon is decomposed by heat absorbed from the hot gases to form carbon black in gaseous suspension.

A process of that general type has been described and claimed, for instance, in the W. C. Ekholm Patent No. 2,599,981 is accordance with which a violently swirling stream of hot blast flame gases is established and maintained in an elongated, unobstructed, heat-insulated reaction chamber of circular cross-section and the hydrocarbon to be decomposed, herein designated "make" or "hydrocarbon make," is introduced through the side wall of the furnace chamber and injected radially inwardly into the swirling hot gas stream passing through the chamber.

In copending application Ser. No. 777,635, of one of us, filed December 2, 1958, an improved process of a somewhat similar type is described and claimed, whereby a violently swirling stream of hot blast flame gases is established and maintained in the furnace chamber, as described in the said Ekholm patent, and a gas-atomized, liquid hydrocarbon make is forcefully injected into the hot gas stream from a position at, or in close proximity to, the longitudinal axis of the chamber and directed radially outwardly toward the side wall of the chamber.

Our present process, in one of its aspects, resembles those just described, insofar as the establishing and maintaining of the hot gas stream is concerned, but is a radical departure therefrom with respect to the manner of introducing the hydrocarbon make.

According to one known type of operation in which a swirling stream of hot blast flame gases is established and maintained within an elongated, cylindrical furnace chamber, it has been proposed to pass the hydrocarbon make longitudinally through the chamber as a coaxial, concentrated core of the hydrocarbons surrounded, and shielded from the furnace wall, by a blanket of the helically-flowing stream of hot combustion gases. It should be noted that the process of the present invention differs fundamentally from processes of that type in that in our process the hydrocarbon make is injected directly into the swirling hot gases and is rapidly dispersed therein.

In the present process, there must be no such concentrated core of the hydrocarbon make, and in that aspect of the present invention in which a swirling stream of hot blast flame gases is established and maintained in the furnace chamber, the hydrocarbon concentration adjacent the longitudinal axis of the chamber is actually very low relative to that of the surrounding annular section of the hot gas stream.

In accordance with a further aspect of the present invention, there is established and maintained within an elongated, unobstructed, heat-insulated reaction chamber, of either circular or rectangular cross-section, a turbulent stream of hot blast flame gases of substantially uniform composition and of substantially uniform velocity and turbulence over substantially the entire cross-sectional area of the chamber, and flowing longitudinally through the chamber. A hot gas stream of this character is, with advantage developed by injecting longitudinally into one end of the chamber a multiplicity of streams of a combustible mixture, said streams being uniformly and symmetrically positioned over substantially the entire cross-sectional area of the chamber, and burning the combustible mixture as it enters the chamber, as more fully described in Patent 2,440,424, the hydrocarbon make being injected into this stream of hot blast flame gases as hereinafter described.

According to a further previously known type of operation, disclosed, for instance, in the Ayers patent, Re. 22,886, a heavy liquid hydrocarbon, e.g., a low-grade crude petroleum, is injected longitudinally into one end of a cylindrical furnace chamber as an extremely finely-atomized spray stream, produced by passing the oil at a pressure of 2000 to 6000 pounds per square inch through an atomizing nozzle, and is partially burned by air injected tangentially into the furnace chamber and partially decomposed to form carbon black by the heat thus generated.

Still other types of processes have been proposed for producing carbon black, differing from one another in many respects. But all of the prior processes, of which we are aware, have had in common the requirement that the hydrocarbon make be introduced into the furnace chamber in a highly dispersed state, either as a gas or vapor, or as a finely atomized liquid spray.

In many instances, natural gas, or a natural gas enriched by oil vapor, has been used as the make. In operations using a liquid hydrocarbon make, it has been considered essential, by some operations, that the make be readily vaporizable and that it be vaporized either before, or immediately upon entering the furnace chamber. When using heavier, high-boiling liquid hydrocarbons as the make, it has been considered essential to introduce it into the furnace chamber as a highly-atomized spray stream either by injecting it through a mono-fluid spray nozzle under extremely high pressure, in accordance with the previously noted Ayers patent, or else through a two-fluid spray nozzle using a gaseous atomizing fluid such as air or steam or a liquid atomizing fluid such as superheated liquid water under high pressure.

This necessity for introducing the hydrocarbon make into the furnace chamber in a highly dispersed condition has imposed a great economic burden on the industry. Gaseous hydrocarbons, such as natural gas, are frequently unobtainable and where available have become increasingly costly. Readily vaporizable hydrocarbons are usually economically unavailable as a raw material for producing carbon black.

Because of their availability at relatively low cost and their high carbon content, heavy, high-boiling hydrocarbon materials, such as highly aromatic tars or residues or extracts, derived from coal or petroleum, are presently highly desirable raw materials for use as hydrocarbon make in producing carbon black. However, their use has been subject to even greater difficulty in introducing them into the furnace chamber in highly dispersed form.

Our present invention provides a method and means whereby these heavy hydrocarbon tars, and the like, just described, are used as the hydrocarbon make and whereby the necessity for introducing them into the reaction zone in a highly dispersed state is entirely avoided. Further, we can produce, in accordance with our invention, higher yields of carbon black equal in quality to, and in many respects superior to, carbon blacks produced by processes employing a high degree of dispersion of the make at, or prior to, the point of introduction to the furnace chamber.

The invention is applicable to the use, as the make, of a large variety of relatively low cost and readily available hydrocarbon residues or tars such as obtained through the destructive distillation of petroleum or coal, more advantageously materials of that type having an aromaticity ranging from about 75% to about 100%, a mean molecular weight ranging from about 150 to about 350, and a UOP characterization factor, K, ranging from 9 to 10.9. Aromatic residues such as obtained by thermally cracking recycled stock from the catalytic cracking of petroleum to produce motor fuels, and the like, and the high-boiling aromatic extracts obtained from the solvent refining of various petroleum fractions are specially desirable for use in our present process.

Our process thus has the economic advantage of low costs and high yields derived from the use of hydrocarbon make of the type just described. Further, by avoiding the necessity of high-pressure atomization and the use of atomizing fluids, there is obtained a substantial economy in equipment by elimination of compressors, boilers, mixers, and the like, and the cost of operating such auxiliary equipment. A marked reduction in unproductive time, ordinarily consumed in servicing the atomizers and auxiliary equipment, and a substantial reduction in power requirements are also obtained by our invention.

When one considers that when an atomizing fluid is used it must be heated within the furnace chamber from a temperature of say 250° F. to the furnace temperature of 2600° F. or higher and that in accordance with the present invention that heat can be utilized for the pyrolysis of the hydrocarbon make to carbon black, the benefits derived from the present process are readily apparent. Further, where air is used as the atomizing fluid, that air consumes a portion of the hydrocarbon make by combustion and thus reduces the yield of carbon black. Also, since in operations of this sort, certain equilibrium reactions are unavoidable in obtaining a chemical balance in the furnace chamber and since these side reactions occur when carbon black is being produced regardless of the furnace loading, an increase in the furnace loading over that previously possible results in a very sizable increase in yield per gallon of the hydrocarbon make as well as an increase in the production rate of a given carbon black furnace. The elimination of the atomizing fluid also reduces the amount of cooling required per pound of carbon black produced.

Of equally greater importance, is the fact that, in accordance with our present process, we can increase not only the production rate for a given size furnace and increase the yield of carbon black per gallon of hydrocarbon make charged to the furnace but can also improve the rubber-compounding characteristics of the carbon black so produced.

The primary use of carbon black is in compounding rubber for producing automobile tires and the like. It is well-known to the rubber industry that the quality of the rubber composition is largely controlled by the characteristics of the carbon black compounded with the rubber. High tensile strength of the resultant rubber composition is, of course, desirable. It is likewise highly desirable that the rubber composition possess good hysteresis properties so as to minimize overheating in use. Unfortunately, it is heretofore been found that carbon blacks which impart high tensile strength to the rubber composition do not generally impart optimum hysteresis characteristics to the rubber, as indicated by rebound tests, and likewise carbon blacks which impart optimum hysteresis characteristics to the rubber composition usually do not impart high tensile strength. As hereinafter illustrated, carbon blacks produced in accordance with our present invention have been found to impart to rubber compositions both high tensile strength and optimum hysteresis characteristics.

In carrying out the process of our present invention, in its presently preferred aspect, we establish and maintain within an elongated furnace chamber of circular cross-section a violently swirling stream of hot blast frame gases and inject the hydrocarbon make into the chamber, from a point coaxially positioned with respect to the chamber and near one end thereof, as a thin, continuous sheet of the liquid make in the form of a hollow, expanding cone. In other words, at the point of injection, the expanding annular sheet forming the hollow cone is composed, substantially completely, of a single phase of liquid, as distinguished from droplets or atomized liquid spray, and maintains that condition, as visually observed, for a substantial distance beyond the point of injection, ranging from at least 3 inches to 4.5–5 inches or more, equivalent to a time period of the order of 1/300 second. The liquid make appears to vaporize progressively, and beyond the point just mentioned, incandescent carbon particles begin to appear, indicating decomposition of the hydrocarbon to carbon black.

As more fully described in the previously noted copending application Ser. No. 777,635, it has been found that when a helically-flowing stream of blast flame gases is established and maintained within a cylindrical furnace chamber by forcefully injecting a combustible gas mixture into the upstream end of the chamber, in a direction substantially tangential to the inner circular side wall thereof, and burning the gas mixture as it enters the chamber, there is a very substantial difference in linear velocity of the hot gases along their helical path at various zones over the transverse section of the upstream end of the chamber. This velocity is relatively slight in a circular zone coaxial with the longitudinal axis of the chamber and having a diameter approximately one-half that of the chamber. But outwardly beyond this central zone the swirling of the blast gases is greatly intensified, reaching a maximum or peak velocity and again diminishing as the chamber side-wall is approached.

In accordance with this aspect of the present invention, it is essential that the spread angle of the liquid cone and the initial velocity thereof be such that the continuous thin sheet of liquid make quickly passes diagonally outwardly through the zone of lower velocity gases toward the higher velocity zone, while being subjected to intense heating but without becoming dispersed as liquid droplets. We have found that the optimum spread angle for establishing this condition will vary somewhat with the diameter of the furnace chamber and the velocity of the blast flame gases but should not be less than about 60° nor greater than about 120°.

The resistance of the liquid stream to being shattered and dispersed prematurely will largely depend upon the mass velocity of the liquid stream relative to that of the blast flame gases in contact therewith and will also depend, to some extent, upon the initial thickness of the sheet of liquid make. Though the latter is not readily susceptible to accurate measurement, the described condition may be visually observed, and excellent results have been obtained where the calculated initial thickness of the sheet of oil constituting the cone is within the range of about 0.005 inch to about 0.01 inch.

While we do not intend to be bound to any theoretical explanation, it presently appears from visual observations and tests that the entering, relatively thin sheet of liquid make is intensely heated—furnace temperatures ranging from 2200° to 3500° F. usually 2500°–2700° F.—and progressively vaporized, as it passes through the lower velocity central zone, to form an outer annulus of oil vapors and that the vapors so formed, because of their lower mass velocity, are rapidly and uniformly dispersed in the hot gases prior to conversion to carbon black. Since the oil vapors are distributed so nearly perfectly uniformly by this hollow cone pattern of injection, and are rapidly uniformly dispersed and highly heated by direct turbulent mixing with the hot gases, there results a carbon black of greater fineness than heretofore produced, from a hydrocarbon make of comparable character at comparable furnace loading.

In accordance with that aspect of the invention whereby a longitudinally-flowing, uniform stream of hot blast flame gases is established and maintained, the hydrocarbon make is injected substantially longitudinally into the hot gas stream as an expanding liquid cone, as previously described. However, the linear velocity of the hot gas stream so produced is, of necessity, substantially less than that resulting from the tangential injection of the combustible mixer, and is, of course, uniform throughout the cross-sectional area of the furnace chamber. Under these velocity conditions, the integrity of the liquid cone may be readily maintained, as just described, the make being progressively vaporized and the vapors rapidly dispersed in the turbulent hot gases. Though somewhat less pronounced improvements in the carbon black product have been obtained through the use of this application of the present invention, nevertheless marked economic advantages may be obtained thereby.

For introducing the make stream we use, with advantage, an injector assembly, as hereinafter more fully described, adapted to extend coaxially through the upstream chamber wall and terminating at its inner end in a circular face not less than 1 inch, and preferably 2 to 3 inches, in diameter. The hydrocarbon make passes from the injector assembly into the furnace chamber through a single annular outwardly-expanding exit port coaxially positioned with respect to said face, extending slightly beyond the inner face of the assembly and terminating in a relatively sharp-edged circular lip. This exit port is formed by a conical seat and a coaxially-positioned conical member adapted to cooperate with said seat and, advantageously, to be moved coaxially with respect thereto for varying the thickness of the annular opening.

The pressure under which the oil is supplied to the exit port is subject to considerable variation, depending upon the viscosity of the hydrocarbon make and the desired rate of feed to the furnace chamber, as well as the desired initial velocity and character of the make stream. In general, a relatively low pressure not exceeding about 100 pounds per square inch is used, more advantageously within the range of about 40 pounds to about 80 pounds per square inch. The required pressure for optimum operating conditions may be reduced by preheating the hydrocarbon make and thus reducing its viscosity. Preheating of the oil to a temperature necessary to reduce viscosity to a value of 100 SSU or below is desirable. For the preferred feed stocks this temperature is normally only 200° to 250° F. and the viscosity becomes about 40 SSU. It is thus noted that only relatively low preheats and relatively low pressures are required for satisfactory performance. High temperatures—e.g. 750° F.—are not desirable and have not shown any advantage in the use of this injector.

Having in mind permissible variations in viscosity of the hydrocarbon make and the pressure under which it is supplied to the exit port of the injector assembly, the position of the conical member relative to the cone-shaped seat is adjusted so as to inject the hydrocarbon make into the furnace chamber as a single continuous liquid phase, as above described, i.e., without atomization or subdivision into droplets in gaseous suspension. This condition is readily determined by visual observation.

The invention will be further described and illustrated with reference to the accompanying drawings of which:

FIG. 1 is a longitudinal sectional view of a carbon black furnace of circular cross-section especially adapted to the carrying out of the first described aspect of our present process, FIG. 2 is a transverse sectional view along the line 2—2 of FIG. 1, FIG. 3 is a somewhat enlarged longitudinal sectional view of a hydrocarbon make injection assembly especially adapted to the carrying out of the process of the present invention, FIG. 4 is a transverse sectional view along the line 4—4 of FIG. 3, FIG. 5 is a fragmentary longitudinal sectional view showing the front end of a carbon black furnace especially adapted to the carrying out of the second described aspect of the present invention, and FIG. 6 is a transverse sectional view along the line 6—6 of FIG. 5.

Referring to FIG. 1 of the drawings, there is represented at 1 an elongated cylindrical reaction chamber leading at its downstream end into a vertical cooler, fragmentarily represented at 2. The cylindrical inner wall 3 of chamber 1 is of suitable furnace refractory adaptable to withstand the necessary high temperatures and is surrounded by a layer of fire brick 4 which, in turn, is surrounded by a layer of heat-insulating material 5, all encased by metal jacket 6.

At its upstream end, the chamber 1 is enlarged to form a combustion zone 7 of a diameter substantially in excess of its length to provide a zone of larger volume for the burning of a combustible mixture, of fuel gas and air, for instance, introduced into zone 7 through burner ports 8 directed into zone 7 substantially tangential to the cylindrical side wall thereof, as more fully shown in FIG. 2.

The enlargement of chamber 1 at its upstream end, as shown at 7, for instance, makes it possible to increase the rate at which the hot blast flame gases are generated and has been generally found advantageous. However, it will be understood that the present invention, in its broader aspect, is applicable to operations of the type described carried on in furnace chambers of substantially uniform diameter throughout. Further, the particular construction of the furnace, except as hereinafter prescribed, may be varied considerably without departing from the scope of this invention. For instance, the hot blast flame gases may be separately generated outside of the chamber shown by burning either a gaseous or liquid fuel and the hot products of combustion, at the temperature required to decompose the hydrocarbon make, injected tangentially into the chamber. It is essential, however, according to the preferred aspect of the invention, that there be established and maintained within the furnace chamber a swirling stream of the hot blast flame gases flowing longitudinally through the chamber along a helical path at high velocity, as previously noted.

The enlarged combustion zone 7 is circular in cross-section and coaxially positioned with respect to chamber 1 and is delineated by walls of furnace refractory 9. An annular air chamber 10 is positioned about the outer wall of combustion zone 7 and is connected thereto by the plurality of burner ports 8 provided with burner tubes 11, cut diagonally at their outer ends, and through which fuel inlet pipes 12 extend coaxially. Air for combustion is delivered under pressure tangentially to chamber 10 through air conduit 13.

In FIG. 1 two separate sets of tangential burners are shown. It will be understood that only one set of burner ports is usually required in a furnace of this type but that where two are provided, they may be used either interchangeably, depending upon operating conditions required, or both sets of burner ports may be used simultaneously without departing from the scope of this invention. The fuel pipes 1 are removably supported by caps 14, threaded onto, or otherwise secured to, the projecting tubes 15.

A hydrocarbon make injector assembly 16, as more fully shown in FIG. 3 of the drawings, extends coaxially through the upstream end wall 17 into the combustion zone 7, and where it passes through the furnace wall is surrounded by a sleeve 18 through which the assembly is free to slide so as to adjust the position of its exit port with respect to the downstream end wall 19 of the combustion zone. This adjustment may be accomplished by appropriate manipulation of the set screws 20 extending through collar 21 which is secured to the furnace structure by flange 22.

The injector assembly, as more fully shown in FIG. 3 of the drawings, comprises a coaxially-positioned, cylindrical make conduit 23 delineated by tubular wall 24 and surrounded over a greater portion of its length by a coaxial, annular dead-air space 25 lying between the tube 24 and tubular wall 26. The tube 26 is, in turn, surrounded by the coaxial annular passageway 27 delineated by outer cylindrical wall 28. Coaxially positioned with respect to the wall 28 is an outer wall 29 enclosing annular passageway 30.

Secured to the downstream end of the tube 29, as by welding, there is a circular end plate 31 recessed at 32 and threaded at 33 to receive the removable end plug 34 in which there is coaxially positioned an exit port 35.

The exit port 35, at its outer end, is flared outwardly to form a conical seat 36 adapted to cooperate with the coaxially-positioned conical member 37 to form an outwardly flaring adjustable annular opening 38. The adjustable member 37 is secured to a stem 39 extending coaxially through the exit port 35 and secured at its inner end to shaft 40 which extends coaxially outwardly through the assembly and is provided at its outer end with a hand wheel 41.

The outer end of shaft 40 is threaded, as indicated at 42, and extends through a cooperating, internally-threaded valve cap 43 secured to the end of tube 24 as by welding and provided with packing gland 44.

By turning the hand wheel 41, the postion of the conical member 37 can be adjusted with respect to the conical seat 36 and when the desired adjustment has been obtained, the shaft 40 may be locked in position by means of lock nut 45.

In operation, the hydrocarbon make is charged to the injector assembly from any suitable source through inlet 46 and passes through conduit 23 to the inwardly-extending portion of the end plug 34, at which point the conduit 23 is connected with the exit port 35 through a plurality of circular openings 47.

Because of the nature of the hydrocarbons used in accordance with our present invention, it is essential that they be protected from overheating while passing through the injector assembly in order to avoid carbon or coke-forming decomposition. It is also important that overheating of the elements of the assembly by the hot furnace gases be avoided. For this reason, the assembly is jacketed, as previously described, for the circulation of a cooling medium, water for instance. The cooling medium is introduced through inlet 48, passes to the inner end of the assembly through the annular conduit 27 and from thence through the perforations 49 extending through end closure 50, as more clearly shown in FIG. 4 of the drawings, into the annular conduit 30 and passes back therethrough to the exit opening 51.

It has been found desirable, at times, to use a gaseous fluid as the cooling agent, instead of water. In some instances where a gaseous coolant is used, especially when the combustible mixture is blasted longitudinally into the furnace chamber, as hereinbefore described, it has been found advantageous to modify the injection assembly so that the inner end of cooling conduit 27 opens into the furnace chamber whereby the gaseous coolant passes into the furnace chamber instead of being recirculated through conduit 30. This method of operation is especially applicable where the cooling fluid is steam, a combustible gas or air, and it has been found that thereby the characteristics of the resultant carbon black may frequently be modified to advantage.

In order to maintain the stem 39 in a coaxial position with respect to the exit port 35, the end plug 34 is provided with an inwardly-extending portion 52, as previously noted, having at its innermost end a supporting bearing 53. Further, this inwardly-extending portion 52, though generally of circular section, is, with advantage, cut away at opposite sides, as more clearly shown at 54 in FIG. 4, of the drawings, in order to provide freer passage of the hydrocarbon make to the exit port.

As previously noted herein, the diameter of the inner face of the injection assembly should be not less than 1 inch and preferably should be 2–3 inches, and the coaxially-positioned conical seat 36 should terminate at its inner end in a relatively sharp-edged circular lip. Advantageously this lip should extend beyond the inner face of the assembly a distance of not less than $\frac{1}{32}$ inch, advantageously a distance ranging from $\frac{1}{32}$ inch to $\frac{1}{4}$ inch. This arrangement has been found to promote continuous trouble-free operation of the injection assembly and to contribute to the remarkable results obtained by the present process.

In the injection of a stream of liquid of the type here involved, there is a tendency for the liquid to drip from the injection nozzle and, at customary carbon black furnace temperatures, ranging from 2200° to 3500° F., a carbonaceous deposit would ordinarily rapidly form on the nozzle eventually rendering it inoperable. In the operation of our improved injection assembly, such dripping and coking difficulties are avoided, apparently due to the fact that the outer surface of the projecting lip is constantly swept free of oil by a current of the hot furnace gases promoted by the arrangement described. Of equal, if not greater, importance is the fact that the base of the liquid oil cone entering the furnace chamber is thereby rendered more accessible to immediate contact with the hot furnace gases so that any vapor formed is immediately swept away from the hot metal surfaces of the injector.

An especially advantageous arrangement is to terminate the lip of the exit port substantially flush with the downstream end of the assembly and to progressively and gradually depress the outer surface of the end plug from the outer periphery of the plug to the base of said lip. This lip and depression arrangement are shown, respectively, at 55 and 56.

As shown in FIG. 3 of the drawings, the inner surface of the projecting lip is a continuation of the conical seat, and together they define the angle of spread of the injected cone of liquid make.

In the particular furnace shown in FIGS. 1 and 2 of the drawings, and used in carrying out the runs of the specific examples herein, except as otherwise indicated, the longitudinal dimension of the enlarged combustion zone was 16 inches and the diameter thereof was 30 inches. The diameter of the reaction zone was 11 inches and the longitudinal dimension thereof was approximately 11 feet. This furnace was also provided with a refractory collar of reduced diameter, and sometimes called choke section, at the entrance from the combustion zone to the reaction zone, this choke section being 8 inches inside diameter and 8 inches long.

The combustion section of the furnace was provided with 2 sets of tangential blast burners, of 6 burners each, symmetrically positioned about the combustion chamber as more clearly shown in FIG. 2 of the drawings, these sets of tangential burners enter the combustion chamber on centers about 3½ inches from the upstream, and downstream, end walls thereof, respectively, the burner ports being 3 inches inside diameter. In the operations of the follow examples, all 6 burners of each set were used.

We have found that in operations in accordance with the present invention, the characteristics of the resultant carbon black may be varied at will by changing the position of the exit port of the make injector assembly with respect to the entrance from the enlarged combustion zone to the reduced diameter zone of the reaction chamber, as is illustrated by the present example.

For instance, for producing a carbon black having high rebound characteristics in a furnace of the indicated type and dimensions, we have found that the hydrocarbon make should be introduced approximately 8 inches upstream from the exit from the combustion chamber. However, the optimum position for injecting the hydrocarbon make has been found to vary, not only with respect to the desired characteristics of the carbon black produced, but also will vary somewhat with the size and relative dimensions of the furnace chamber. Therefore, the position for injecting the hydrocarbon make, in accordance with our invention, cannot be precisely defined, but in view of the present disclosure can be readily determined by varying the position of the injector until the desired results have been obtained.

It will be understood that the invention is not restricted with respect to size and relative dimensions of the furnace chamber, but that those factors do definitely influence the characteristics of the carbon black produced, as hereinafter illustrated.

The same method and means for injecting the hydrocarbon make are used with advantage in that aspect of the invention in which the hot gases are blasted longitudinally through the furnace chamber. Apparatus adapted to the carrying out of this type of operation is fragmentarily represented by FIGS. 5 and 6 of the drawings in which an elongated furnace chamber of substantially uniform cross-sectional area throughout is represented at 57. The entire chamber is lined by a layer of furnace refractory 58 which, in turn, is covered by layers 59 of heat-insulating material, all enclosed in an outer metal casing 60.

The upstream end of this furnace chamber is closed by a burner block 61 through which there extend a multiplicity of burner ports 62 symmetrically and uniformly positioned over the entire cross-sectional area of the burner block. The outer end of the burner block is enclosed by a wind box 63 in which there are positioned fuel manifolds 64 from which spuds 65 lead to the repective burner ports.

In operation, air for combustion is supplied under pressure to the wind box through inlet 66 and fuel gas is charged under pressure to the manifolds through line 67.

A hydrocarbon make injector, such as shown in FIGS. 3 and 4 of the drawings, extends coaxially through the wind box and burner block into the upstream end of the chamber and is adapted to be moved back and forth to adjust the position of its inner end with respect to the inner face of the burner block, as more fully described with respect to FIG. 1 of the drawings.

The blast burner described is adapted to produce in the furnace chamber a longitudinally-flowing stream of hot blast flame gases of substantially uniform temperature and velocity over the entire cross-sectional area of the furnace chamber and, as more clearly shown in FIG. 6 of the drawings, the hollow cone of liquid make is initiated by the injector represented at 68 positioned coaxially with the furnace chamber and the hot gas stream passing therethrough and, by reason of its mass velocity, expands outwardly through the hot gas stream so that the hot gases impinge on the upstream side of the liquid sheet and rapidly uniformly disperse the hydrocarbon vapors as formed, as previously described herein.

The utility of the invention is not limited to operations in which the hot gas stream is produced as specifically illustrated herein. The invention, in its broader aspect, is applicable to any furnace carbon black operations of the type in which a high velocity stream of combustion gases, at a temperature in excess of that at which hydrocarbons are decomposed to carbon black, is established and maintained in an elongated furnace chamber and in which a liquid hydrocarbon make of the type herein described is injected longitudinally into the stream of hot gases passing through the chamber and rapidly uniformly mixed therewith.

In order to minimize the number of variables, we have in each of the operations of the following specific examples used as the hydrocarbon make a concentrate of highly aromatic, high molecular weight hydrocarbons, of the type currently used in the production of carbon black, obtained from the solvent refining of cracked petroleum fractions and having the following physical properties:

Viscosity, SSU at 210° F. _____ 74
API gravity _____ 3.9
Percent aromaticity _____ 83
Characterization factor (K) _____ 10.2
Average mol. wt. _____ 290

EXAMPLE I

Run Nos. 1, 2, 5 and 6 of this example were carried on in accordance with the present invention and run Nos. 3, 4, 7 and 8 were carried out, for comparative purposes, by injection of the hydrocarbon make into the furnace chamber as an atomized, two-fluid spray stream, using steam under a pressure of 80 pounds per square inch as the atomizing fluid. Other operating data and the results thereof are set forth in the following tabulations:

*Table 1*

| Run No | 1 | 2 | 3 | 4 | 5 | 6 | 7 | 8 |
|---|---|---|---|---|---|---|---|---|
| Type of injection | Mon-fluid | | Bi-fluid | | Mon fluid | | Bi-fluid | |
| Injector position | 0 | 0 | 0 | 0 | −8 | −8 | −8 | −8 |
| Injector oil pres. p.s.i.g | 40 | 80 | 40 | 80 | 40 | 80 | 40 | 80 |
| Blast air, M c.f.h | 175 | 175 | 175 | 175 | 175 | 175 | 175 | 175 |
| Blast ratio | 12.0 | 12.0 | 12.0 | 12.0 | 12.0 | 12.0 | 12.0 | 12.0 |
| Oil rate, g.p.h | 192 | 198 | 182 | 182 | 192 | 192 | 180 | 186 |
| Colloidal and chemical properties: | | | | | | | | |
| T.S., percent std. FF | 119 | 120 | 120 | 120 | 118 | 119 | 118 | 119 |
| O.A., gal./100 lbs | 15.5 | 16.1 | 15.6 | 15.6 | 15.2 | 15.8 | 16.1 | 16.6 |
| I² ads | 109 | 119 | 106 | 106 | 88 | 88 | 105 | 109 |
| Rubber properties, OEP-57 60' cure at 290° F. (avg. of 4 tests): | | | | | | | | |
| L-300 | 1,485 | 1,490 | 1,500 | 1,465 | 1,600 | 1,610 | 1,510 | 1,500 |
| Tensile | 3,315 | 3,300 | 3,290 | 3,290 | 3,215 | 3,180 | 3,265 | 3,245 |
| Elongation | 530 | 525 | 525 | 530 | 500 | 505 | 515 | 520 |
| Shore hardness | 58 | 58 | 58 | 58 | 58 | 58 | 59 | 59 |
| Log R | 2.9 | 3.0 | 3.0 | 3.0 | 3.9 | 3.9 | 3.2 | 2.9 |
| Percent rebound | 47.5 | 47.6 | 47.2 | 47.5 | 50.5 | 51.2 | 48.3 | 47.8 |
| Rubber properties, NR-59 30' cure at 293° F. (avg. of 4 tests): | | | | | | | | |
| L-300 | 2,400 | 2,470 | 2,360 | 2,460 | 2,530 | 2,510 | 2,450 | 2,400 |
| Tensile | 4,525 | 4,420 | 4,400 | 4,570 | 4,460 | 4,390 | 4,420 | 4,410 |
| Elongation | 520 | 490 | 500 | 520 | 500 | 490 | 500 | 520 |
| Shore hardness | 71 | 71 | 72 | 71 | 71.8 | 71.5 | 71.3 | 71.3 |
| Percent rebound | 57.9 | 60.0 | 60.5 | 59.5 | 62.0 | 62.0 | 59.9 | 59.9 |

It will be understood that, in the foregoing table, and other tabulations herein, the injection position indicated as "0" coincides with the exit from the enlarged combustion zone, that position indicated by a minus value indicates the distance in inches upstream from the combustion zone exit and that position indicated as plus value indicates the distance in inches downstream from the enlarged combustion zone exit.

In the runs 1, 2, 5 and 6, the spread angle of the make stream was 60° and the face of the end plug was cut back 1/16 inch from the lip of the exit port.

In each run, the blast flame gases were generated by burning natural gas at the rate of 14,600 cubic feet per hour with 175,000 cubic feet per hour of air, as heretofore described.

In determining the rubber compounding characteristics of the carbon blacks produced by the respective runs of Table 1, the formulations of the rubber compositions in which the oil-extended polymer and the natural rubber, respectively, were used were as follows.

Table 2

RUBBER RECIPES

OEP-57—Oil extended polymer recipe:

| | Parts |
|---|---|
| OEP 1710 | 100 |
| Carbon black | 50 |
| Zinc oxide | 3 |
| Stearic acid | 2 |
| Agerite HP [1] | 1 |
| Santoflex AW [2] | 1 |
| Sulfur | 1.3 |
| NOBS spec.[3] | 0.7 |
| DPG[4] (20% M.B.) | 0.25 |
| Total | 159.25 |

NR-59—Natural rubber recipe:

| | |
|---|---|
| Rubber crepe | 100 |
| Carbon black | 50 |
| Stearic acid | 3 |
| Zinc oxide | 5 |
| Altax [5] | 0.6 |
| Sulfur | 2.5 |
| Total | 161.1 |

[1] Agerite HP—phenyl betanaphthylamine plus diphenyl-paraphenylenediamine, antioxidant; R. T. Vanderbilt Co.
[2] Santoflex AW—6-ethoxy-1,2-dihydro-2,2,4-trimethylquinoline, antioxidant and ozone protector, Monsanto Chemical Co.
[3] NOBS spec.—N-oxydithylene benzothiazole-2-sulfenamide; delayed action accelerator, American Cyanamid Co.
[4] DPG—1,3-diphenylguanidine.
[5] Altax—benzothiazyl disulfide accelerator; R. T. Vanderbilt Co.

From the data set forth in the foregoing Table 1, it appears that with the make injector set at the zero position, there was no substantial difference between rubber compounding properties of carbon black produced in accordance with the present invention and those produced using the conventional bi-fluid atomized sprays. However, it appears that substantial increases in both production rate and yield were obtained by the runs illustrative of our present invention. It also appears that using the −8″ injection position, runs 5 and 6, carried out in accordance with our present invention, produced carbon blacks having rebound characteristics and production rates distinctly higher than those produced by runs 7 and 8 carried on in accordance with conventional procedure.

EXAMPLE II

Operations of this example illustrate variations in the rubber compounding characteristics produced in accordance with our present invention by varying the injection position. Each of these runs was carried out in apparatus of the type and dimensions heretofore described and under the operating conditions of Example I, except as indicated in the following tabulation:

Table 3

| Run No | 9 | 10 | 11 | 12 | 13 | 14 |
|---|---|---|---|---|---|---|
| Injector position | −10 | −8 | −6 | 0 | +4 | +8 |
| Injector oil press., p.s.i.g | 40 | 40 | 40 | 40 | 80 | 80 |
| Blast air, M c.f.h | 175 | 175 | 175 | 175 | 175 | 175 |
| Air/gas ratio | 12.0 | 12.0 | 12.0 | 12.0 | 12.0 | 12.0 |
| Oil rate, g.p.h | 196 | 196 | 196 | 196 | 196 | 196 |
| Colloidal and chemical properties: | | | | | | |
| Tinting strength, percent std. FF | 120 | 120 | 122 | 120 | 119 | 117 |
| Oil absorption, gal./100 lbs | 15.0 | 14.8 | 14.9 | 15.8 | 16.1 | 14.5 |
| Iodine adsorption | 108 | 93 | 103 | 107 | 104 | 100 |
| Rubber properties, 30′ cure at 292° F., NR-59 (avg. of 4 tests): | | | | | | |
| L-300 | 2,285 | 2,240 | 2,330 | 2,403 | 2,600 | 2,280 |
| Tensile | 4,265 | 4,230 | 4,300 | 4,429 | 4,505 | 4,220 |
| Elongation | 510 | 520 | 510 | 515 | 490 | 505 |
| Percent rebound | 62.5 | 64.1 | 62.0 | 60.5 | 60.5 | 62.5 |

From the foregoing tabulation, it appears that optimum rebound characteristics were obtained using the −8″ injection position, that optimum tensile strength characteristics were obtained with the injection position ranging from −6″ to +4″ and that optimum modulus characteristics were obtained with the injection position varying from 0 to +4″. Thus the invention provides means whereby the rubber compounding characteristics of the carbon black may be varied at will over a substantial range by merely changing the injection position without change in the characteristics of the hydrocarbon make or in furnace dimensions or design or operating conditions.

In addition to the positioning of the hydrocarbon make injector and the type of hydrocarbon make used, the angle of spread of the hydrocarbon make stream is of vital importance. We have, as previously noted, found that this spread angle should be at least about 60° but should not exceed about 120°. More advantageously, the spread angle should fall within the range extending from about 60° to about 90°.

Also, as previously noted herein, it is essential for satisfactory operation, in accordance with the present invention, that the outer periphery of the injector exit port extend slightly beyond the inner face of the assembly and terminate in a relatively sharp-edged circular lip. Without a lip, such as described, the entering hydrocarbon make has been found to wet the inner face of the assembly and coke thereon, eventually interrupting or interfering with the entering make stream. Further, we have found that oil accumulates on the inner face of the assembly so rapidly as to fall therefrom in droplets resulting in the forming of undesirable coke particles in the carbon black. By the extending lip just described, these conditions are substantially completely avoided and the operation may be carried on over extended periods without interruption due to injector difficulties.

While we cannot explain with certainty why this amazing difference is brought about by the extending lip, it appears, from visual observation, that in operations carried on in accordance with the present invention, the hot furnace gases sweep inwardly around the base of the oil stream and across the inner face of the injector assembly, thus keeping said face and the coaxially-positioned lip free from oil and from coke formation.

This effect is further promoted, as heretofore described, by recessing the inner face of the injector assembly from near its periphery to the periphery of the base of said lip, the recess becoming progressively deeper as the lip is approached, thus forming a cavity in the outer face of the injector surrounding the lip. We have found that this construction promotes the sweeping of hot blast flame gases about the apex of the conical oil stream, sweeping over the end face of the injector and in contact with the lip and causing a clean break between the oil stream and the lip.

Further, we have found most surprisingly, that the characteristics of the furnace black produced are materially influenced by the depth of this recess from the outer surface of the lip. This distance may, with advantage, as previously noted, vary from about 1/32 inch to about 1/4 inch and, more advantageously, should be about 3/32 inch. This arrangement not only keeps the injector free from coking but also permits the uninterrupted injection of the hydrocarbon make in the previously described manner.

The effect of varying the spread angle of the entering stream of hydrocarbon make and also the effect of varying the extent of projection of the injector port lip outwardly from the face of the injector, are illustrated by the following example:

EXAMPLE III

In each of the operations of this example, the hydrocarbon make was that previously described herein and each of the runs was made in a furnace substantially the same as that used in Example I. Air was charged at the rate of 175,000 cubic feet per hour and the blast ratio, i.e., air/fuel gas, was 11.0. The oil load was adjusted to give comparable fineness, as indicated by tinting strength.

Runs 16 to 19, inclusive, were carried out in accordance with the present invention and run 15, for comparative purposes, was carried on in accordance with conventional procedure whereby the hydrocarbon make was atomized into the furnace chamber using steam at a pressure of 60 pounds per square inch and at a temperature of 500° F. as the atomizing fluid. Other operating conditions and the results obtained are set forth in the following tabulation:

*Table 4*

| Run No | 15 | 16 | 17 | 18 | 19 |
|---|---|---|---|---|---|
| Type injector | Bi-fluid | Mono-fluid | | | |
| Spread angle, degrees | 180 | 60 | 90 | 90 | 90 |
| Tip cut-back, inch | None | 1/16 | 3/16 | 3/16 | 3/16 |
| Injector position | −4 | −8 | −6 | −6 | −6 |
| ABC color | 140 | 135 | 141 | 143 | 140 |
| Tensile Strength, percent std. FF | 119 | 115 | 115 | 121 | 115 |
| Oil absorption, gal./100 lbs | 15.2 | 14.2 | 16.0 | 15.5 | 15.4 |
| Prod. rate, lbs./day | 12,350 | 14,900 | 21,200 | 22,600 | 23,650 |
| Yield, lbs./gal. oil | 3.41 | 4.03 | 4.65 | 4.65 | 4.73 |

As shown by the foregoing tabulation, both production rate and yield increased with increasing depth of the cutback in the face of the injector and with increased spread angle. All runs made in accordance with the present invention showed results markedly superior to those obtained by the comparative run No. 15.

The optimum position of the injection of the hydrocarbon make for obtaining predetermined results, in accordance with our present invention, has been found to vary somewhat with the spread angle of the injection stream and also with the inner diameter of the reaction zone and the inner diameter of the reduced section, or choke, at the entrance to the reaction zone from the combustion zone. These features, just mentioned, have been found materially to influence the rebound characteristics of the carbon black produced.

The injection position for producing carbon blacks of optimum rebound characteristics using a spread angle of 90°, in apparatus comprising a reaction zone 11 inches inside diameter and a choke section 8 inches inside diameter, has been found to range from the −4" position to the −8" position, more advantageously, the −6" position. In the same furnace using a spread angle of 60°, the injection position has been found to range from the −6" position to the −10" position, more advantageously, the −8" position.

In using apparatus comprising a reaction zone 18 inches inside diameter and a choke section of 11 inches inside diameter, we have found that the optimum injection position for a 90° spread angle falls within the range from −6 inches to −8 inches, preferably −8 inches, and with a 60° spread angle the optimum injection position falls within the range extending from the −8" position to the −12" position, preferably approximating the −10" position.

The optimum position of the injector for obtaining predetermined results is also influenced to some extent by the velocity of the hot blast flame gases which, in turn, is dependent upon the rate at which the combustible gas and air for combustion are charged to the tangential burners and also the port size of said tangential burners. However, the tangential blast velocity does not appear to be a major factor and is less important than reaction chamber dimension and choke section dimension in determining the optimum injection position.

In the foregoing examples, the make injector assembly used was as illustrated in FIG. 3 of the drawings. The runs of the following examples were carried out using a slightly modified type of injector for producing the previously described hollow cone of liquid make and also illustrate operations in reaction chambers of different diameters for the production of different types of carbon black. In each of these examples, the hydrocarbon make used was that specifically described herein and the diameters of the reaction zones of the furnace chamber, injection positions and general operating conditions were as indicated.

EXAMPLE IV

| Type of carbon black | SAF | | ISAF | |
|---|---|---|---|---|
| Run No | 20 | 21 | 22 | 23 |
| Diameter of reaction zone, inches | 18 | 11 | 11 | 18 |
| Diameter of choke section, inches | 11 | 8 | (¹) | 11 |
| Injection position | | | | |
| Air, M c.f.h | 220 | 200 | 235 | 235 |
| Blast ratio | 10.5 | 10.5 | 11.8 | 12.5 |
| Oil, gals./hr | 240 | 230 | 240 | 260 |
| Oil/air ratio | 1.09 | 1.15 | 1.02 | 1.10 |
| Yield lbs./gal | 3.71 | 4.12 | 4.21 | 4.21 |

¹ No choke.

EXAMPLE V

This example further illustrates the production of SAF and ISAF blacks, respectively, from the previously-described hydrocarbon make in accordance with our present invention. These operations were carried out in a furnace having a reaction zone 18 inches inside diameter and a choke section 11 inches inside diameter. Other operating conditions and the results obtained are set forth in the following tabulation:

*Table 5*

| Run No | 24 | 25 |
|---|---|---|
| Type of carbon black | SAF | ISAF |
| Injector position | −10 | −10 |
| Air, M c.f.h | 200 | 175 |
| Blast ratio | 10.2 | 11.0 |
| Oil feed, g.p.h | 220 | 255 |
| Production rate, lbs./day | 63,700 | 78,000 |
| Yield, lbs./gal | 3.98 | 4.43 |
| ABC color index | 150 | 143 |
| Tinting strength, percent std. FF | 130 | 119±1 |

In comparable operations using a two-fluid atomizing spray with the identical hydrocarbon make, the downtime due solely by make injector difficulty was found to be 2.5 hours per month of operation for producing carbon black of the ISAF type, whereas using the monofluid injector according to the present invention the downtime due to injector difficulty was only 0.5 hour per month. Similarly, in producing SAF type carbon black using a two-fluid atomizing spray, the down-time due solely to spray difficulty was 0.83 hour in 9 days, whereas for a similar period of operation in accordance with our present invention, no operating time was lost due to injector difficulties.

We claim:

1. In the process for producing carbon black by the decomposition of a hydrocarbon make in which there is established and maintained within an elongated furnace chamber a stream of combustion gases at a temperature in excess of that at which the hydrocarbon make is decomposed to carbon black and flowing through the chamber under conditions of high velocity and turbulence and the hydrocarbon make is separately and forcefully injected into the hot gas stream, rapidly dispersed therein and decomposed by heat absorbed therefrom to form carbon black in suspension, the effluent passing from the downstream end of the chamber and the carbon black separated and collected, the improvement which comprises the steps of injecting a hydrocarbon make consisting essentially of high molecular weight, highly-aromatic liquid hydrocarbons into the stream of hot gases, under a pressure not exceeding about 100 pounds per square inch, as a thin sheet substantially completely in a continuous liquid phase and in the form of an expanding hollow cone initiated coaxially with the furnace chamber and near one end thereof, the angle of spread of said cone being not less than about 60° nor greater than about 120°.

2. In the process for producing carbon black by the decomposition of a hydrocarbon make in which a helically-flowing stream of hot blast flame gases is established and maintained within an elongated, heat-insulated reaction chamber of circular cross-section and the hydrocarbon make is separately and forcefully injected into said hot gas stream, is rapidly dispersed therein and decomposed by heat absorbed therefrom to form carbon black in suspension, the effluent passing from the downstream end of the chamber and the carbon black separated and collected, the improvement which comprises the steps of injecting a hydrocarbon make consisting essentially of high molecular-weight, highly-aromatic liquid hydrocarbons into the stream of hot gases, under a pressure not exceeding about 100 pounds per square inch, as a thin sheet substantially completely in a continuous liquid phase and in the form of an expanding hollow cone, initiated coaxially with the reaction chamber and near one end thereof, the angle of spread of said cone being not less than about 60° nor greater than about 120°.

3. The process for producing carbon black by the decomposition of a hydrocarbon make in which a combustible mixture of a fluid hydrocarbon fuel and an oxygen-containing gas is blasted tangentially into a cylindrical combustion zone of an elongated, heat-insulated reaction chamber, said combustion zone having a diameter greater than its length and opening at its downstream end into a coaxially-positioned zone of said chamber of smaller diameter and of a length greater than its diameter, and the combustible mixture is burned in the combustion zone to form a swirling stream of hot blast flame gases flowing longitudinally through said chamber at a high velocity along a helical path and the hydrocarbon make is separately and forcefully injected into said hot gas stream, is rapidly dispersed therein and decomposed by heat absorbed therefrom to form carbon black in suspension, the effluent passing from the downstream end of the reaction chamber and the carbon black separated and collected, the improvement comprising the steps of injecting a hydrocarbon make consisting essentially of high molecular-weight, highly-aromatic liquid hydrocarbons into the stream of hot gases, under a pressure not exceeding about 100 pounds per square inch, as a thin sheet substantially completely in a continuous liquid phase and in the form of an expanding hollow cone, initiated coaxially with the reaction chamber and near one end thereof, the angle of spread of said cone being not less than about 60° nor greater than about 120°.

4. The process of claim 3 in which the make stream is initiated in the enlarged combustion zone.

5. The process of claim 3 in which the make stream is initiated in the reaction zone of reduced diameter.

6. The process of claim 3 in which the make stream is initiated at the exit from the enlarged combustion zone.

7. The process of claim 1 in which the initial thickness of the injected liquid sheet of hydrocarbon make is within the range from about 0.005 inch to about 0.01 inch.

8. The process of claim 2 in which the hydrocarbon make is one having an aromaticity within the range from about 75% to about 100%, a mean molecular weight within the range from about 150 to about 350 and a UOP characterization factor, K, within the range from 9 to 10.9.

References Cited in the file of this patent

UNITED STATES PATENTS

| | | |
|---|---|---|
| 1,877,350 | Meachem | Sept. 13, 1932 |
| 1,903,100 | Esterling | Mar. 28, 1933 |
| 2,651,534 | Krejci | June 9, 1953 |
| 2,873,099 | Whittke | Feb. 10, 1959 |
| 2,971,822 | Williams | Feb. 14, 1961 |

UNITED STATES PATENT OFFICE
CERTIFICATE OF CORRECTION

Patent No. 3,079,236                                February 26, 1963

George L. Heller et al.

It is hereby certified that error appears in the above numbered patent requiring correction and that the said Letters Patent should read as corrected below.

Column 1, line 20, for "is" read -- in --; column 3, line 35, for "equi ibrium" read -- equilibrium --; line 63, for "is" read -- has --; column 6, line 65, for "pipes 1" read -- pipes 12 --; column 9, line 34, for "positinoed" read -- positioned --; columns 9 and 10, Table 1, first column, line 9 thereof, for "$I^2$ ads" read -- $I_2$ ads --; column 13, Table 4, under "Run No. 18" for "1 1" read -- 121 --; column 16, line 49, for "2,651,534" read -- 2,641,534 --.

Signed and sealed this 22nd day of October 1963.

(SEAL)
Attest:

ERNEST W. SWIDER                                EDWIN L. REYNOLDS

Attesting Officer                               Acting Commissioner of Patents